(No Model.)

L. G. KREGEL.
FASTENER FOR LIDS, COVERS, &c.

No. 343,245. Patented June 8, 1886.

Attest:
J. W. Hoke.
N. B. Anderson.

Inventor:
Louis G. Kregel
by C D Moody
atty

UNITED STATES PATENT OFFICE.

LOUIS G. KREGEL, OF ST. LOUIS, MISSOURI.

FASTENER FOR LIDS, COVERS, &c.

SPECIFICATION forming part of Letters Patent No. 343,245, dated June 8, 1886.

Application filed March 20, 1886. Serial No. 196,005. (No model.)

*To all whom it may concern:*

Be it known that I, LOUIS G. KREGEL, of St. Louis, Missouri, have made a new and useful Improvement in Fasteners for Lids, Covers, Doors, Sashes, and Similar Constructions, of which the following is a full, clear, and exact description.

This improved fastener consists as follows: The lid or other part to be fastened is provided with a nut and a bolt, the bolt passing through the lid or part, and at its outer end being threaded to engage with the nut, which is adapted to work on the outer side of the lid or part, and at its inner end being threaded, or provided with a screw-shaped projection, which is adapted to enter a mortise in that part of the construction against which the lid or part closes. In closing the lid or part the nut is turned to loosen the bolt, thereby enabling the inner end of the bolt to enter the mortise and the lid or part to be closed. The nut is then turned the opposite way, thereby causing the bolt to be tightened so that it cannot be rotated in the bearing in the lid and the inner end of the bolt in consequence to be fastened in the mortise. This causes the lid or part to be fastened, and before it can be unfastened the nut must be reversed again to loosen the bolt sufficiently for it to rotate in its bearing in the lid and its inner end to unwind from the mortise.

The annexed drawings, making part of this specification, exhibit the most desirable mode of carrying out the improvement.

Figure 1:
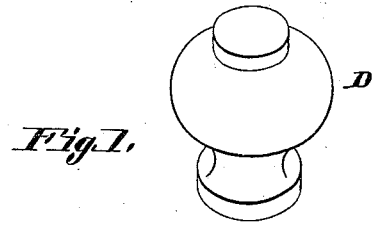
Figure 2:
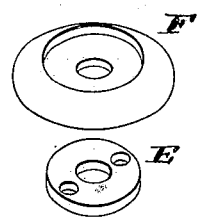
Figure 2:
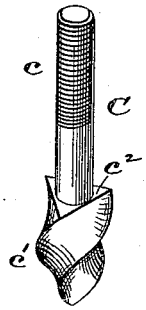
Figure 2:
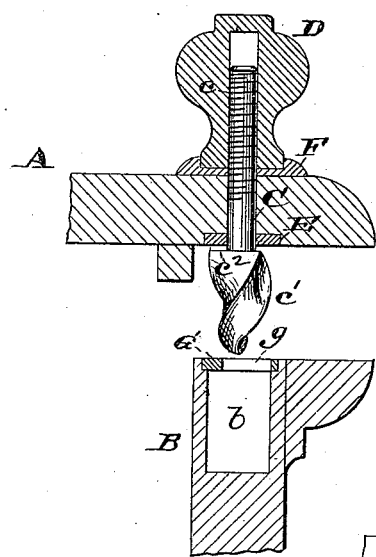
Figure 3:
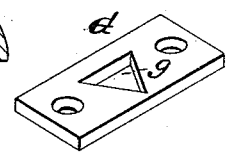
Figure 3:
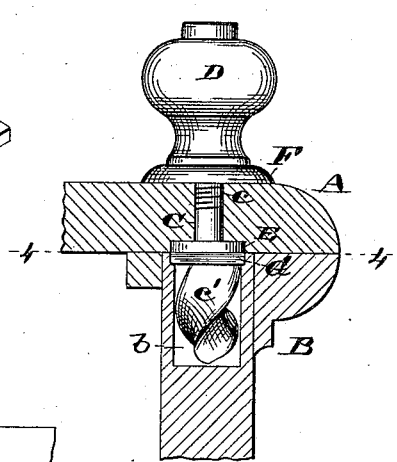
Figure 4:
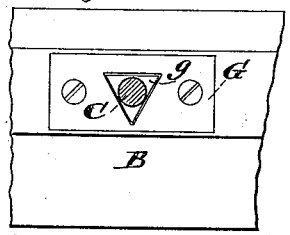

Figure 1 exhibits in perspective the various parts of the construction, saving the mortised portion penetrated by the inner end of the bolt. The parts are shown detached from each other. Fig. 2 is a sectional view showing the lid opened. Fig. 3 is a similar view showing the lid closed and locked, and Fig. 4 is a section on the line 4 4 of Fig. 3.

The same letters of reference denote the same parts.

A represents the lid or part to be fastened, and B represents the part to which the lid is fastened.

C represents the bolt which passes through the lid. Its outer threaded end, $c$, engages in the nut D, which in the present instance is in the form of a knob. The inner end, $c'$, of the bolt is shaped, preferably, as is shown in Figs. 1, 2, 3, it being threaded, as stated, but the thread being coarser and more inclined than that of the end $c$, and the end tapers to a point, and at the point $c^2$ the bolt is constructed to form a shoulder, which, when the bolt is drawn upward, encounters the inner side of the lid, or, preferably, a wearing-plate, E, upon the inner side of the lid. There is also a wearing-plate, F, upon the outer side of the lid for the nut D to bear upon, which plate may be shaped in any desirable form. The end $c'$, as shown, is triangular, but it may be otherwise formed—for instance, it may be round—without departing from the principle of the improvement. The mortise $b$ in the part B is of proper dimensions to admit the bolt end $c'$. At its upper end a plate, G, is attached to the part B. This plate is perforated at $g$ to admit the bolt end $c'$, the perforation being just large enough and properly shaped to conform to the cross-section of the bolt end $c'$.

After the bolt end $c'$ has been passed through the perforation $g$ the lid is fastened to the part B by rotating the nut in the direction to cause the bolt to be screwed upward into the nut until the bolt-shoulder $c^2$ encounters the plate E, as shown in Fig. 3, and by continuing to turn the nut in the same direction the bolt becomes sufficiently tightened in the lid to resist any tendency to turn backward and its end $c'$ to unwind from the mortise $b$ and perforation $g$ when an upward strain is applied to the lid, for, owing to the shape of the end $c'$, that part cannot be drawn directly upward or outward from the perforation $g$, but can only be disengaged therefrom by unwinding it, and so long as the bolt, by the means described, is prevented from rotating, the bolt-end $c'$ remains engaged in the perforation $g$ and the lid remains fastened; but by slightly loosening the bolt in the lid and nut, the lid can be readily opened by drawing it upward or outward from the part B, for as soon as the bolt is loosened the opening of the lid causes the end $c'$ to unwind from the perforation $g$. This feature of the improvement renders it of special value in connection with coffins or burial-caskets, for by simply loosening the knobs a turn or two the lid can be at once opened, and as readily closed by turning the nuts the opposite way.

The parts C D G, and, if desired, the additional parts E F, can be supplied as an article of manufacture to the trade, to be applied to various constructions, as above named and as occasion may require, and in many instances the bolt C only, constructed as described, may be supplied as an article of merchandise, leaving to the consumer the applying of the nut and perforated plate thereto. The plate G, which in practice forms the roof of the mortise $b$, is the part which holds the bolt end $c'$, the mortise serving to receive that portion of the bolt end which passes below the plate G. The mortise might be made screw-shaped to conform to the end $c'$, but it is better to make the mortise larger in cross-section than the end $c'$ and rely only on the plate G for holding the end $c'$, as thereby the operation of opening and closing the lid is facilitated.

I claim—

1. The combination of the part A, the nut D, the bolt C, threaded at its outer end, screw-shaped at its inner end, and having a shoulder, $c^2$, and the perforated plate G, substantially as and for the purpose set forth.

2. The combination, in a fastener for lids, covers, doors, sashes, and similar constructions, of the rotatable bolt C, screw-shaped at $c'$, with the perforated plate G, substantially as described.

3. The combination of the part A, the nut D, and the bolt C, threaded at $c$, and having the shoulder $c^2$, and a strike-plate for the bolt to engage with, as described.

4. As a new article of manufacture, the bolt C, threaded at $c$, screw-shaped at $c'$, and having the shoulder $c^2$, as described.

5. The combination of the part A, the part B, having the mortise $b$, and the perforated plate G, the bolt C, threaded at $c$, screw-shaped at $c'$, and having the shoulder $c^2$, the nut D, and the plates E F, substantially as described.

LOUIS G. KREGEL.

Witnesses:
C. D. MOODY,
B. F. REX.